(12) United States Patent
Falardeau et al.

(10) Patent No.: US 7,676,443 B2
(45) Date of Patent: Mar. 9, 2010

(54) SYSTEM AND METHOD FOR PROCESSING DATA ELEMENTS IN RETAIL SALES ENVIRONMENT

(75) Inventors: Simon Falardeau, Laval (CA); Jerome Poulin, Montreal (CA)

(73) Assignee: SAP AG, Walldorf (DE)

( * ) Notice: Subject to any disclaimer, the term of this patent is extended or adjusted under 35 U.S.C. 154(b) by 378 days.

(21) Appl. No.: 11/601,093

(22) Filed: Nov. 17, 2006

(65) Prior Publication Data

US 2008/0120265 A1    May 22, 2008

(51) Int. Cl.
*G06F 15/18* (2006.01)
(52) U.S. Cl. ........................................ 706/47
(58) Field of Classification Search .............. None
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,444,820 A * | 8/1995 | Tzes et al. | 706/21 |
| 5,546,507 A * | 8/1996 | Staub | 706/60 |
| 5,615,109 A | 3/1997 | Eder | |
| 5,701,400 A * | 12/1997 | Amado | 706/45 |
| 5,758,327 A | 5/1998 | Gardner et al. | |
| 5,870,716 A | 2/1999 | Sugiyama et al. | |
| 5,930,771 A | 7/1999 | Stapp | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,260,024 B1 | 7/2001 | Shkedy | |
| 6,341,351 B1 | 1/2002 | Muralidhran et al. | |
| 6,405,191 B1 * | 6/2002 | Bhatt et al. | 707/3 |
| 6,505,093 B1 | 1/2003 | Thatcher et al. | |
| 6,507,851 B1 | 1/2003 | Fujiwara et al. | |
| 6,701,299 B2 | 3/2004 | Kraisser et al. | |
| 6,725,204 B1 | 4/2004 | Gusley | |
| 6,868,528 B2 | 3/2005 | Roberts | |
| 6,910,017 B1 | 6/2005 | Woo et al. | |
| 6,980,966 B1 | 12/2005 | Sobrado et al. | |

(Continued)

FOREIGN PATENT DOCUMENTS

JP    2004-030343 A    1/2004

(Continued)

OTHER PUBLICATIONS

U.S. Appl. No. 60/374,892, filed Apr. 22, 2002, Krajec.

(Continued)

*Primary Examiner*—David R Vincent
*Assistant Examiner*—Ola Olude-Afolabi
(74) *Attorney, Agent, or Firm*—Foley & Lardner LLP

(57) ABSTRACT

A system for processing rules on data elements is described. The system includes a memory queue configured to receive and store a listing of data elements and a rule processing engine configured to apply one or more processing rules to one or more data elements. The rules processing engine further includes a rule condition processing engine configured to apply a condition to a data element and store the data element in the memory queue if the condition is satisfied and a rule action processing engine configured to iteratively perform an action on the elements stored in the memory queue.

18 Claims, 3 Drawing Sheets

U.S. PATENT DOCUMENTS

| | | | |
|---|---|---|---|
| 7,031,951 B2 * | 4/2006 | Mancisidor et al. | 706/60 |
| 7,080,030 B2 | 7/2006 | Eglen et al. | |
| 7,082,408 B1 | 7/2006 | Baumann et al. | |
| 7,092,929 B1 | 8/2006 | Dvorak et al. | |
| 7,100,083 B2 * | 8/2006 | Little et al. | 714/26 |
| 7,117,165 B1 | 10/2006 | Adam et al. | |
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,275,048 B2 * | 9/2007 | Bigus et al. | 706/46 |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0049634 A1 | 12/2001 | Stewart | |
| 2002/0013731 A1 | 1/2002 | Bright et al. | |
| 2002/0023500 A1 | 2/2002 | Chikuan et al. | |
| 2002/0026368 A1 | 2/2002 | Carter, III | |
| 2002/0059108 A1 | 5/2002 | Okura et al. | |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0087389 A1 | 7/2002 | Sklarz et al. | |
| 2002/0107713 A1 | 8/2002 | Hawkins | |
| 2002/0116241 A1 | 8/2002 | Sandhu et al. | |
| 2002/0123930 A1 | 9/2002 | Boyd et al. | |
| 2002/0138290 A1 | 9/2002 | Metcalfe et al. | |
| 2002/0147668 A1 | 10/2002 | Smith et al. | |
| 2002/0152128 A1 | 10/2002 | Walch et al. | |
| 2002/0184116 A1 | 12/2002 | Tam et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0074269 A1 | 4/2003 | Viswanath | |
| 2003/0126024 A1 | 7/2003 | Crampton et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0171998 A1 | 9/2003 | Pujar et al. | |
| 2003/0172007 A1 | 9/2003 | Helmolt et al. | |
| 2003/0200150 A1 | 10/2003 | Westcott et al. | |
| 2003/0208365 A1 | 11/2003 | Avery et al. | |
| 2003/0229502 A1 | 12/2003 | Woo | |
| 2004/0010463 A1 | 1/2004 | Hahn-Carlson et al. | |
| 2004/0098358 A1 | 5/2004 | Roediger | |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0267674 A1 | 12/2004 | Feng et al. | |
| 2005/0015303 A1 | 1/2005 | Dubin et al. | |
| 2005/0055283 A1 | 3/2005 | Zarovinsky | |
| 2005/0060270 A1 | 3/2005 | Ramakrishnan | |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0086125 A1 | 4/2005 | Cirulli et al. | |
| 2005/0096122 A1 | 5/2005 | Nireki et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0171825 A1 | 8/2005 | Denton et al. | |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2007/0050272 A1 | 3/2007 | Godlewski et al. | |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System For Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

\* cited by examiner

SYSTEM AND METHOD FOR PROCESSING DATA ELEMENTS IN RETAIL SALES ENVIRONMENT

BACKGROUND OF THE INVENTION

The present invention relates generally to the field of database managing updates of large quantities of data elements. More specifically, the present invention relates to a system and method for applying a rule to a large number of data elements where the data elements satisfy a condition associated with the rule.

Large number of data elements may be created where each data element represents a discrete item, concept, class of items, etc. The data elements may be associated with a plurality of data element fields. The data elements and data element fields may have been created over time, by a different set of users, represent a wide variety of objects, etc. such that a variety of structures may be associated with the data element and/or the data element fields.

It may be necessary to apply a general rule to a large number of the data elements despite the different type of data elements and/or data element fields. A user is often required to define a large number of rules to account for the wide variety of structures. Further, the user must utilize a large amount of processing time implementing the rule for each particular structure.

What is needed is a system and method for implement rule processing for data elements where the data elements satisfy a condition independent of the particular data element structure. What is further needed is such a system and method configured to reduce processing overhead associated with the data element rule processing.

SUMMARY OF THE INVENTION

One embodiment of the invention relates to a system for processing rules on data elements. The system includes a memory queue configured to receive and store a listing of data elements and a rule processing engine configured to apply one or more processing rules to one or more data elements. The rules processing engine further includes a rule condition processing engine configured to apply a condition to a data element and store the data element in the memory queue if the condition is satisfied and a rule action processing engine configured to iteratively perform an action on the elements stored in the memory queue.

Another embodiment of the invention relates to a method for processing a rule on one or more data elements. The method includes retrieving one or more data elements, performing condition rule execution processing overhead, storing the retrieved data elements that satisfy a condition in a memory queue, performing rule execution preparation, and processing the rule for each of the data elements in the memory queue.

Yet another embodiment of the invention relates to a system for processing rules on data elements. The system includes a memory queue configured to receive and store a listing of data elements, each data element including a plurality of data element fields and representing a good for sale in a retail environment and a rule processing engine configured to apply one or more processing rules to one or more data elements. The rules processing engine further includes a rule condition processing engine configured to apply a condition to a data element and store the data element in the memory queue if the condition is satisfied and a rule action processing engine configured to iteratively perform an action on the elements stored in the memory queue.

This summary and the following detailed description are directed to certain specific embodiments of the invention. The invention is not limited to the particular embodiments and applications described herein. The invention is defined only by the claims.

DETAILED DESCRIPTION OF THE PREFERRED EMBODIMENTS

Figure 1:
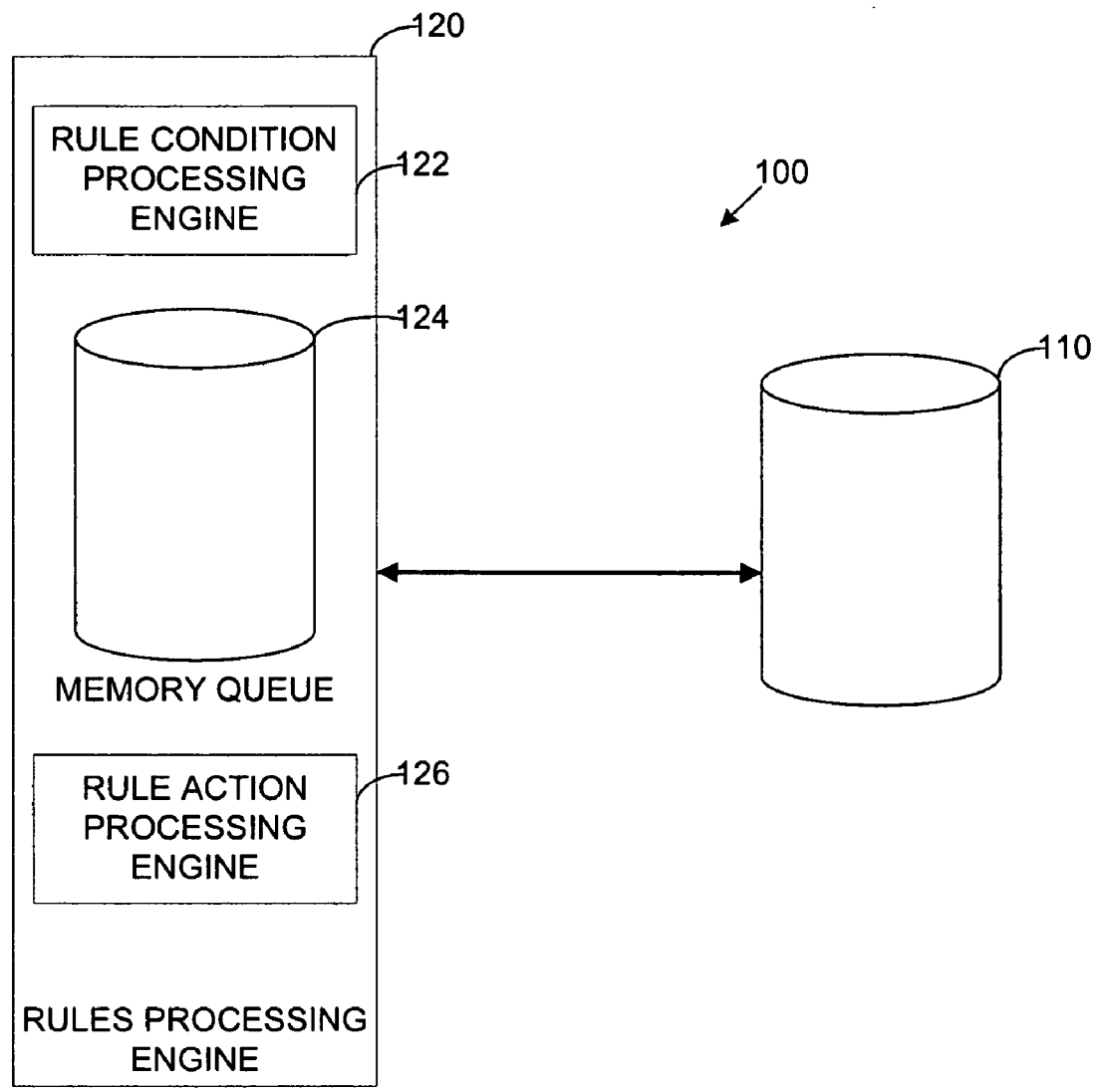
FIG. 1 is a system for allowing a user to define one or more rules based on a single data element structure and execute these rules on a massive amount of data elements corresponding to the data element structure on which the rules are defined, according to an exemplary embodiment.

Referring to FIG. 1, a system 100 for allowing a user to define one or more rules based on a single data element structure and execute these rules on a massive amount of data elements corresponding to the data element structure on which the rules are defined is shown, according to an exemplary embodiment. The definition of a single rule eases workload requirements for the user. The user may define the rule based on the simple data element and/or data element field independent of any structure associated therewith. Application of the data rule on the massive amount of data may be performed in a streamlined manner to optimize performance.

System 100 includes a data elements database 110 and a rules processing engine 120. Although a particular configuration of system 100 is shown, system 100 may be implemented using a single processing system and database, a plurality of processing systems, a plurality of databases, etc. to perform the functions described herein. System 100 may further be configured to include more, fewer, and/or a different configuration of components to perform the functions described herein.

Database 110 may be any database or other collection of data configured to store a massive number of data elements. Database 110 may be configured to implement standard database functionality, including but not limited to, storage of data elements, retrieval of data elements, data element sorting, etc. Database 110 may be implemented using RAM, ROM, one or more hard drives, or any other type of memory device. An exemplary database may be a database of a data elements where each data elements is representative of an article or type of article for sale in a retail setting. Other data elements may include entries in a table, computer records, products, a product class, etc. Each data element may be configured to include one or more data element fields. Exemplary data element fields may include information associated with the particular element. According to the exemplary embodiment, the data element fields may be information related to the article for sale such as an identification number, a description, a color, pricing information, markdown information, etc. Although a database is described, data elements may alternatively be stored in a table, a linked list, or any other large data storage system or method.

Rules processing engine 120 may be any type of processor configured to implement one or more processing rules to process data elements stored in database 110. Processing rules may be implemented as computer code including a plurality of instructions to be implemented using a computer processor. Rules processing engine 120 may be configured to include a rule condition processing engine 122, a memory queue 124, and a rule action processing engine 126.

Rules processing engine 120 is configured to iteratively process the data elements in database 110 to apply a rule to the data element where the data element satisfies a defined condition. Rules may be programmed by a user of system 100. Each rule may be configured to include a condition and an action to be taken based on satisfaction of the condition. An exemplary rule that may be applied can include applying a condition to determine whether the data element has a material group value and, if so, loading the data related to the material group to assigning the data to the relevant fields of the data element. Another exemplary rule can include applying a condition to determine if a data element or data element field does not have a unit of measure and, if so, publishing an error message. Yet another exemplary rule can include applying a condition to determine if the data element or data element field has a correct material group and all other data is correct and, if so, saving it in database 110. Although some exemplary rules are provided herein, it should be understood that applying a rule, including a condition and an action, can encompass a wider variety of concepts and be either specific or very general.

Processing the data elements in database 110 may be initiated by an action taken by a user, based on satisfaction of a preset condition, such as number of items received, a time of day, a time of year, etc. Processing can include selecting a first element, determining whether the element satisfies the condition, storing the data element in a memory queue if the element satisfies the condition and discarding it otherwise, retrieving a second element, determining whether the second element satisfies the condition, etc. Processing may further include performing rule execution preparation overhead prior to processing the first data element. Exemplary rule execution preparation overhead may include loading all material group identifiers from database 110 prior to applying a condition to determine whether a data element has an incorrect material group and, if so, publishing an error message.

Rule condition processing may be performed by rule condition processing element 122. Rule condition processing engine 122 is configured to receive a data element retrieved from the database 110 and determine whether the rule satisfies a given condition. If the condition is satisfied, the data element is stored in memory queue 124. If the condition is not satisfied, no further action is taken on that data element.

After the condition determination has been performed for all of the data elements to be processes, the action defined by the rule may be iteratively performed on the elements in the memory queue 124 by rule action processing engine 126. Performing the action may include performing action execution overhead prior to performing the action on the first data element in memory queue 124. Exemplary rule execution overhead may include loading data related to all material groups for each data element within memory queue 124 where the action to be taken includes assigning the material groups data to the relevant fields of the data elements queued in the memory queue 124.

Figure 2:
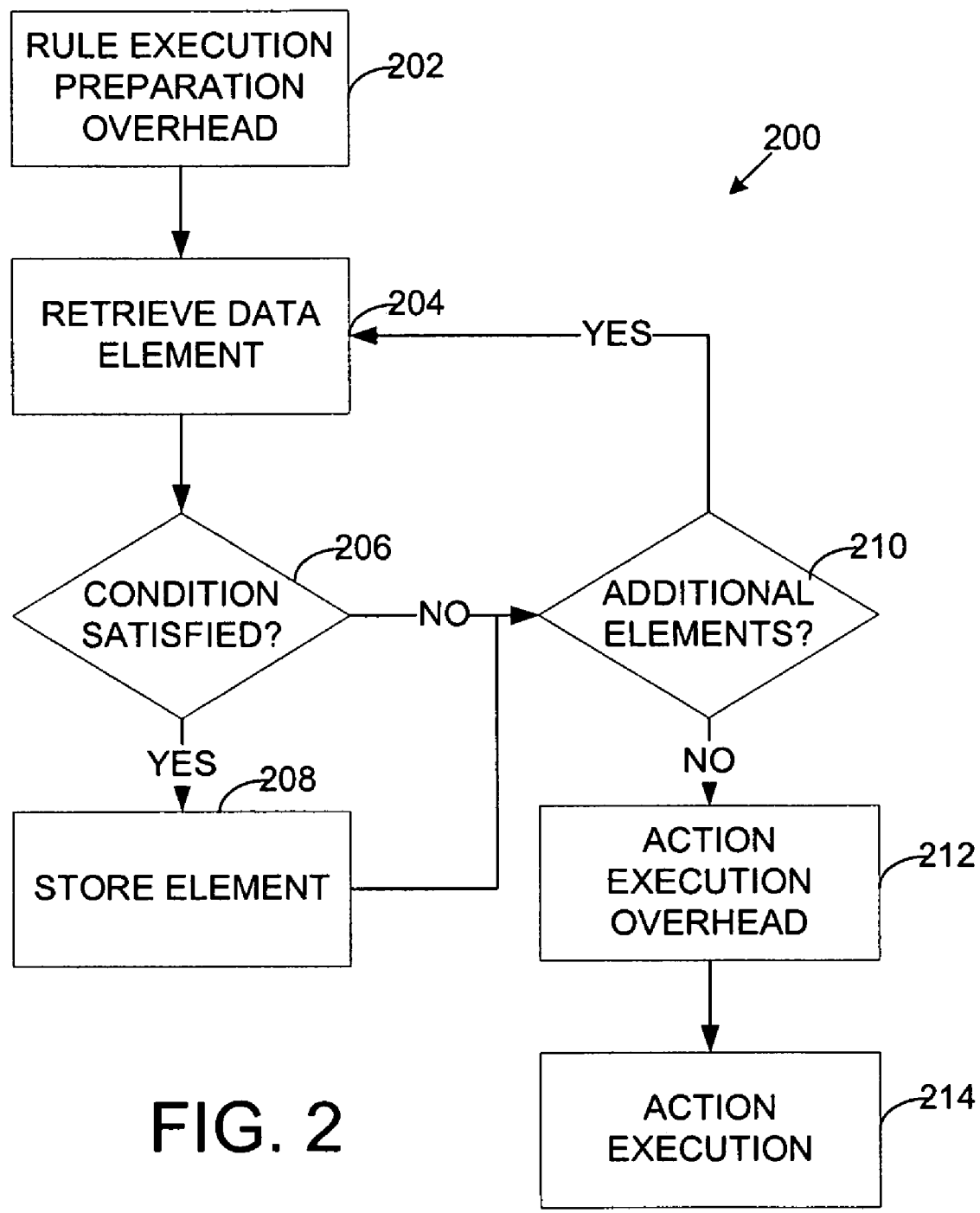
FIG. 2 is a flowchart illustrating a method for applying a rule to one or more data elements based on satisfaction of a condition, according to an exemplary embodiment.

Referring now to FIG. 2, a flowchart 200 illustrating a method for applying a rule to one or more data elements based on satisfaction of a condition is shown, according to an exemplary embodiment. Although specific steps are shown and described as being performed in a specific order, it should be understood that the method may include more, fewer, and/or a different configuration of steps to implement the method described herein.

In a step 202, rule execution preparation overhead is performed. Rule execution preparation overhead may include any step or process to facilitate the conditional process of data elements. Exemplary overhead may include preparing the memory queue, performing initial calculations to facilitate determination of whether a data element satisfies the condition, loading data that might be required in order to analyze the condition such as a current date, a current user, etc.

In a step 204, a data element is retrieved from database 110. Retrieval of a data element may include creating a copy of the data element, creating a pointer in memory to the location of the data element, loading selected data element field from the data element that are the subject of the condition and/or action to be taken, etc. Loading the particular data element, data element pointer, and/or data element field can reduce the difficulty of dealing with particular structure associated with each unique data element.

In a step 206, a determination is made whether the data element satisfies a condition such that the action defined by the current rule should be performed on the data element. Determining whether the condition is satisfied may be performed by the condition rule processing engine 122.

If the condition is satisfied, the data element may be placed in a memory queue 124 in a step 208. Alternatively, the data element may be otherwise marked or reference as being a data element on which the action defined by the rule should be performed. For example, a pointer to the data element may be placed in a table, a data element field associated with the data element may be stored in the memory, etc.

If the condition is not satisfied, or following placement of the data element in memory queue 124, a determination may be made whether additional data elements are available for processing in a step 210. According to an exemplary embodiment, the additional data elements may include all of the remaining data elements in database 110 or a subset of the data elements. If additional data elements are available, step 204 and the following steps are performed again for the additional elements.

If no additional elements are found, action overhead is performed in a step 212. Action overhead may include any fixed cost processing associated with the action. For example, if the action involves accessing database 110 through pointers stored in memory queue 124, the communication with database 110 has a fixed cost which is the same regardless of the amount of data that is retrieved. Examples of action overhead include fixed cost associated with dynamic method calls, database accesses, workflow events, messages between servers, etc.

Following action overhead, data element action processing is performed in a step 214. The method may be performed such that the action overhead is only performed one time, while the action may be iteratively performed for each of the data elements that have satisfied the rule condition.

Figure 3:
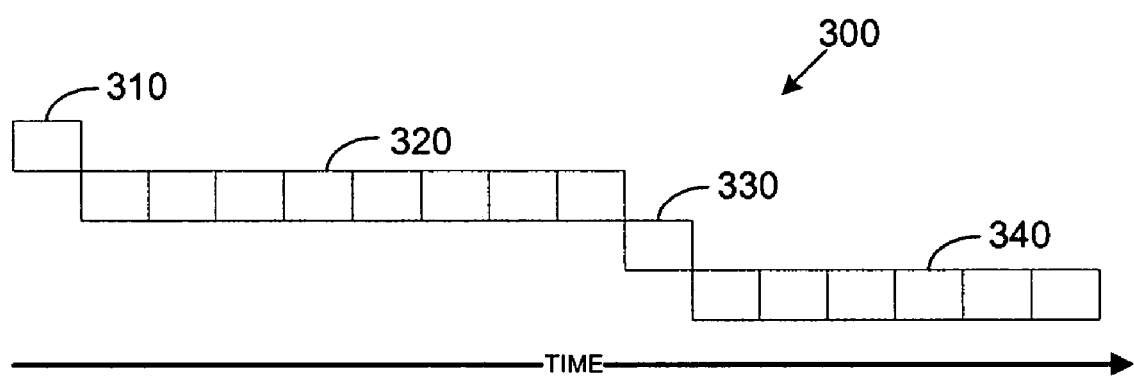
FIG. 3 is a representation of data element processing using the method of FIG. 2, according to an exemplary embodiment.

Referring now to FIG. 3, a representation 300 of data element processing using the method of FIG. 2 is shown, according to an exemplary embodiment. Representation 300 include a plurality of blocks where each block represents processing time. Although the block are shown as having a uniform size, each block may represent an individual amount of processing time.

A condition checking preparation block 310 represents rule execution preparation overhead as described above with reference to FIG. 2. The rule execution preparation overhead may be performed prior to condition checking for the data elements. Rule execution preparation overhead takes a defined amount of processing time defined as the Condition Preparation Time (CPT). Following rule execution preparation overhead, the condition checking may be performed for all of the data elements (N), as represented by the condition checking blocks 320. Condition checking takes a defined amount of processing time defined as the Condition Checking Time (CCT).

Because the data element condition checking is iteratively perform on all of the data elements to be processed (N), the rule execution preparation overhead only needs to be performed a single time, resulting in a savings of processing time equal to $(N-1)*(CPT)$.

Similarly, a rule execution preparation block 330 represents action execution overhead as described above with reference to FIG. 2. The action execution overhead may be performed prior to action execution for the data elements. Action execution overhead takes a defined amount of processing time defined as the Action Preparation Time (APT). Following action execution overhead, the action checking may be performed for all of the data elements (NE) that have satisfied the condition, as represented by the action execution blocks 340. Action execution takes a defined amount of processing time defined as the Action Execution Time (AET).

Because the data element action execution is iteratively perform on all of the data elements that have satisfied the condition (NE), the rule execution preparation overhead only needs to be performed a single time, resulting in a savings of processing time equal to $(NE-1)*(APT)$.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for processing rules on data elements, comprising:
   a computer-readable storage medium providing a memory queue configured to receive and store a listing of a plurality of data elements; and a processing unit implementing a rule processing engine configured to apply one or more processing rules to one or more of the data elements, the rule processing engine including:
- a rule condition processing engine configured to apply a condition to each of the data elements and store the data element in the memory queue if the condition is satisfied; and
- a rule action processing engine configured to iteratively perform an action on the data elements stored in the memory queue;

wherein the rule action processing engine is configured to perform rule execution preparation overhead prior to performing the action on the data elements in the memory queue; and wherein the rule action processing engine is configured to perform the rule execution preparation overhead no more than once, prior to iteratively performing the action on each of the data elements stored in the memory queue.

2. The system of claim 1, wherein the rule action processing engine is configured to perform the action on the elements in the memory queue without additional processing.

3. The system of claim 1, wherein the data elements are representative of articles for sale in a retail sales environment.

4. The system of claim 1, wherein the rule condition processing engine is configured to apply the condition to each of the data elements by determining whether a data element field associated with the data element satisfies the condition.

5. The system of claim 1, wherein the rule condition processing engine is configured to apply the condition to each of the data elements and, if the condition is satisfied, pre-process the data element to prepare for the action to be taken by the rule action processing engine.

6. The system of claim 5, wherein the rule condition processing engine is configured to pre-process the data element by pre-fetching and preparation of a data element field from the data element.

7. A computer-readable storage medium encoded with a computer program for instructing a computer to perform a process, the process comprising the steps of:
- retrieving one or more data elements;
- performing condition rule execution processing overhead;
- determining whether each of the retrieved data elements satisfies a condition and, if the retrieved data element satisfies the condition, storing the retrieved data element in a memory queue;
- performing rule execution preparation; and
- iteratively processing the rule for each of the data elements stored in the memory queue, wherein the rule is processed using a rule processing engine.

8. The computer-readable storage medium of claim 7, wherein processing the rule for each of the data elements in the memory queue is performed without further performing rule execution preparation.

9. The computer-readable storage medium of claim 7, wherein the data elements are representative of articles for sale in a retail sales environment.

10. The computer-readable storage medium of claim 7, wherein determining whether each of the retrieved data elements satisfies a condition comprises determining if a data element field associated with the data element satisfies the condition.

11. The computer-readable storage medium of claim 7, wherein storing the data element in the memory queue includes pre-processing the data element to prepare for the rule processing.

12. The computer-readable storage medium of claim 11, wherein pre-processing the data element includes pre-fetching and preparation of a data element field from the data element.

13. The computer-readable storage medium of claim 7, wherein retrieving one or more data elements includes generating a pointer to the location of the data element in memory.

14. A system for processing rules on data elements, comprising:
- a computer-readable storage medium providing a memory queue configured to receive and store a listing of a plurality of data elements, each of the data elements including a plurality of data element fields and representing a good for sale in a retail environment; and
- a processing unit implementing a rule processing engine configured to apply one or more processing rules to one or more of the data elements, the rule processing engine including:
  - a rule condition processing engine configured to apply a condition to each of the data elements and store the data element in the memory queue if the condition is satisfied; and
  - a rule action processing engine configured to iteratively perform an action on the data elements stored in the memory queue;

wherein the rule action processing engine is configured to perform rule execution preparation overhead prior to performing the action on the data elements in the memory queue.

15. The system of claim 14, wherein the rule action processing engine is configured to perform the action on the elements in the memory queue without additional processing.

16. The system of claim 14, wherein the rule condition processing engine is configured to apply the condition to each of the data elements by determining whether a one of the data element fields associated with the data element satisfies the condition.

17. The system of claim 14, wherein the rule condition processing engine is configured to apply the condition to each of the data elements and, if the condition is satisfied, pre-process the data element to prepare for the action to be taken by the rule action processing engine.

18. The system of claim 17, wherein the rule condition processing engine is configured to pre-process the data element by pre-fetching and preparation of one of the data element fields from the data element.

* * * * *